United States Patent [19]

Bailey

[11] 4,272,717

[45] Jun. 9, 1981

[54] OUTPUT CAPACITOR DISCHARGE CIRCUIT

[75] Inventor: Paul W. Bailey, Flanders, N.J.

[73] Assignee: Hewlett-Packard Company, Palo Alto, Calif.

[21] Appl. No.: 19,525

[22] Filed: Mar. 12, 1979

[51] Int. Cl.³ .............................................. G05F 1/613
[52] U.S. Cl. .................................... 323/226; 323/276; 320/1
[58] Field of Search ........................ 323/8, 9, 20, 22 T; 320/1; 315/238, 240, 241 R; 361/212, 256, 257, 91; 363/50, 53

[56] References Cited

U.S. PATENT DOCUMENTS

| 3,781,642 | 12/1973 | Dutton | 323/22 T |
| 3,819,983 | 6/1974 | Bjork | 315/241 R |
| 4,127,895 | 11/1978 | Krueger | 320/1 X |
| 4,153,871 | 5/1979 | Loucks | 323/8 X |
| 4,167,767 | 9/1979 | de Mere | 361/256 |

Primary Examiner—William M. Shoop
Assistant Examiner—Peter S. Wong
Attorney, Agent, or Firm—Donald N. Timbie

[57] ABSTRACT

In accordance with this invention, the capacitor is discharged through a transistor connected as a negative resistance device so that the current through it increases as the voltage across the capacitor decreases. Means are provided for biasing the transistor to cut-off while the output voltage is being regulated at the selected value, but the bias is removed so as to permit the transistor to conduct and discharge the capacitor under certain conditions, such as (1) when the voltage is programmed downward; (2) when an overvoltage condition exists; or (3) when the line voltage to which the power supply is connected fails or is turned off. In the latter situation, a capacitor supplies operating power to the circuit for a long enough time to permit it to fully discharge the capacitor. In accordance with another aspect of the invention, the time during which the transistor is permitted to conduct is limited so as to permit more current to flow without damaging the transistor and thereby discharge the capacitor more quickly.

11 Claims, 2 Drawing Figures

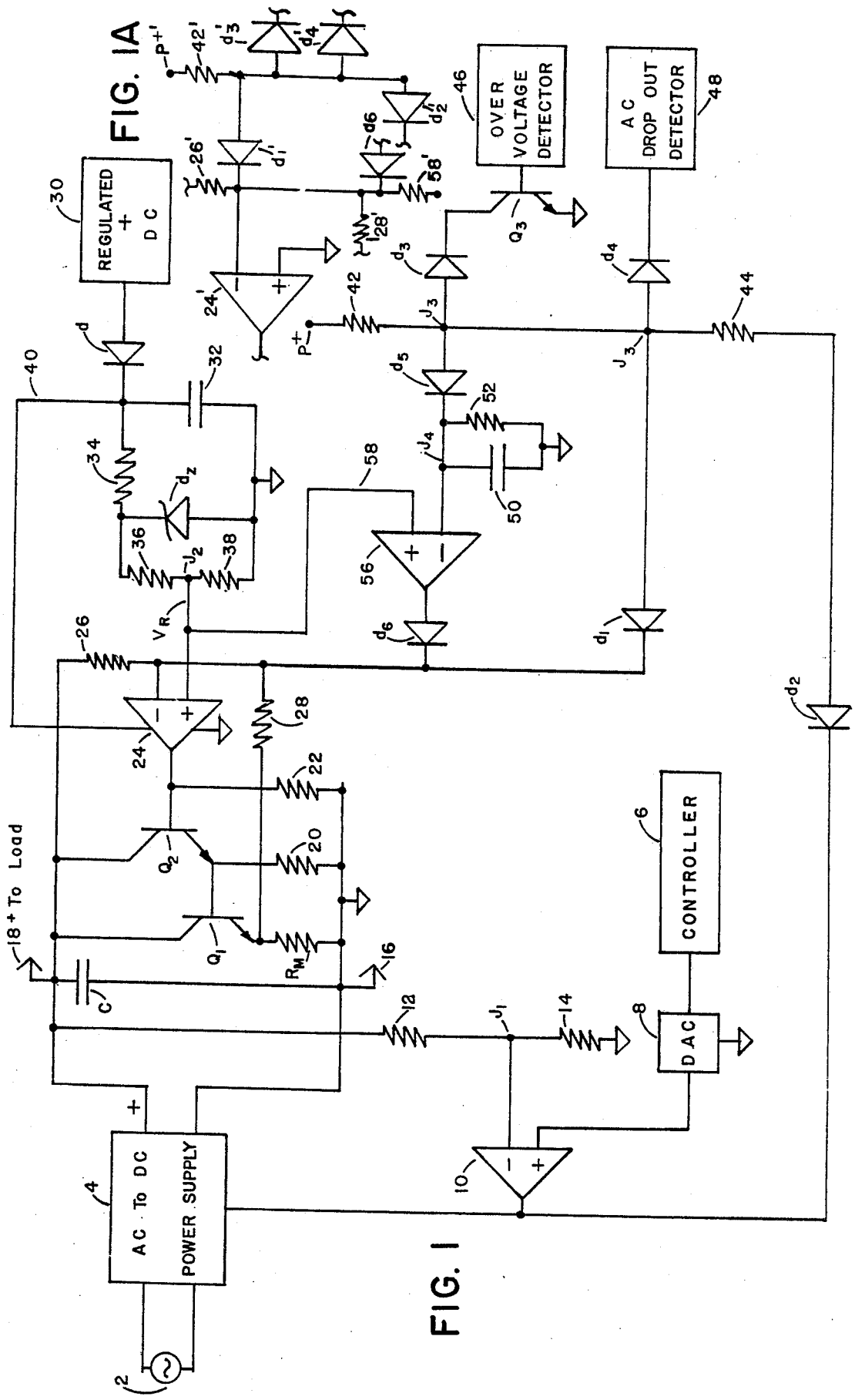

4,272,717

OUTPUT CAPACITOR DISCHARGE CIRCUIT

BACKGROUND OF THE INVENTION

One of the limitations in the speed with which a programmed power supply can operate is the rate at which the output capacitor can be discharged when a reduction in output voltage is called for. When the capacitor is discharged through a shunt resistor, the rate of discharge decreases as the voltage across the capacitor falls; and when the capacitor is discharged through the collector-to-emitter path of a transistor, the current must be limited to the maximum that can be drawn at the higher initial voltage without exceeding the rated safe operating area of the transistor.

BRIEF DISCUSSION OF THE INVENTION

In accordance with this invention, the capacitor is discharged through a transistor connected as a negative resistance device so that the current through it increases as the voltage across the capacitor decreases. Means are provided for biasing the transistor to cut-off while the output voltage is being regulated at the selected value, but the bias is removed so as to permit the transistor to conduct and discharge the capacitor under certain conditions, such as (1) when the voltage is programmed downward; (2) when an overvoltage condition exists; or (3) when the line voltage to which the power supply is connected fails or is turned off. In the latter situation, a capacitor supplies operating power to the circuit for a long enough time to permit it to fully discharge the capacitor. In accordance with another aspect of the invention, the time during which the transistor is permitted to conduct is limited so as to permit more current to flow without damaging the transistor and thereby discharge the capacitor more quickly.

DESCRIPTION OF THE DRAWING

FIG. 1 is a schematic illustration of a power supply containing a preferred embodiment of the invention; and FIG. 1A illustrates an alternative arrangement of a portion of FIG. 1.

POWER SUPPLY

Alternating current voltage from a source 2, which is generally the power line, is converted into a regulated direct current voltage across an output capacitor C by any type of AC-to-DC power supply 4. The desired value that the regulated DC voltage is to have at any moment is represented by the digital output of a controller 6 that operates in response to a program of voltage changes set up by the user. This digital output is converted into a corresponding value of direct current voltage by a digital-to-analog converter 8 and applied to the non-inverting input of an amplifier 10. The inverting input of the amplifier 10 is connected to the junction $J_1$ of resistors 12 and 14 that are connected in series across the capacitor C. The values of the resistors 12 and 14 are selected so as to make the voltage at $J_1$ have the same range as the voltage provided by the digital-to-analog converter 8. Thus, when the controller 6 calls for a decrease in the regulated DC voltage across the capacitor C, the output of the amplifier 10 becomes more negative; and when an increase in the regulated voltage is called for, the output of the amplifier 10 becomes more positive. The AC-to-DC power supply 4 is regulated in response to the voltage at the output of the amplifier 10 in any one of a number of ways known to those skilled in the art to produce the desired value of regulated DC voltage across the output capacitor C. One side of the capacitor C is connected to a floating ground to which an output 16 is connected, and the other side of the capacitor C is connected to an output 18.

Capacitor Discharge Circuit

A circuit for discharging the output capacitor C in accordance with this invention so that the voltage across it can rapidly follow the reductions in voltage demanded by the controller 6 is connected between the outputs 16 and 18. In this circuit, NPN transistors $Q_1$ and $Q_2$ are coupled in a Darlington configuration with their collectors connected to the output 18 and with their emitters respectively connected to floating ground via a small monitoring resistor $R_M$ and a resistor 20. The emitter of $Q_2$ is connected to the base of $Q_1$. The base of $Q_2$ is connected to floating ground via a resistor 22 and also to the output of an operational amplifier 24. The inverting input of the amplifier 24 is connected to the output 18 via a resistor 26 and to the emitter of $Q_1$ via a resistor 28.

In this particular circuit, the non-inverting input of the amplifier 24 is connected to any suitable means for providing a positive regulated DC reference voltage $V_R$. The particular means shown for supplying the voltage $V_R$ includes a source 20 of regulated DC voltage coupled to a capacitor 32 by a diode d. A resistor 34 and a zener diode $d_z$ are connected in series across the capacitor 32, and a desired value of reference voltage $V_R$ is supplied at the junction $J_2$ of resistors 36 and 38 that are connected in series across the diode $d_z$. The junction $J_2$ is connected to the non-inverting input of the amplifier 24.

In order that the amplifier 24 may continue to function for a long enough time after the AC power is shut off to discharge the output capacitor C, its operating potential is derived from the capacitor 32 via a lead 40.

In the particular circuit shown, the Darlington pair $Q_1$, $Q_2$ is prevented from conducting and discharging the storage capacitor C by connecting the inverting input of the amplifier 24 via the cathode-to-anode path of a diode $d_1$ and a resistor 42 to a point of positive potential P+ that is sufficient to make the inverting input more positive than $V_R$. This causes the output of the amplifier 24 to be negative and apply a cut-off bias to $Q_2$ and $Q_1$.

The cathode of a diode $d_2$ is connected to the output of the operational amplifier 10, and the anode of $d_2$ is connected via a resistor 44 to the junction $J_3$ of the diode $d_1$ and the resistor 42. When the output of the operational amplifier 10 is negative with respect to P+ by a predetermined amount, $d_2$ will conduct enough current through the resistors 42 and 44 to make the junction $J_3$ negative with respect to the voltage at the inverting input of the operational amplifier 24 and cut off the diode $d_1$. This removes the positive cut-off bias that is derived from P+ from the inverting input of the amplifier 24 so that its output becomes positive. This makes the Darlington circuit $Q_1$, $Q_2$ conduct and discharges the capacitor C. The voltage of the operational amplifier 10 at which this occurs, hereinafter called the switching voltage, depends primarily on the resistances of the resistors 26, 28, 42 and 44 and on the voltages $V_R$ and P+. By making this voltage negative, the discharge circuit does not go into operation until the desired voltage set by the controller 6 is less than the actual voltage by a predetermined amount.

As the capacitor C discharges, more current flows through $Q_1$ and $Q_2$ so that they act as a negative resistance. The discharge continues until the output voltage across the capacitor C is reduced to a value such that the voltage at $J_1$ causes the output of the amplifier 10 to return to the switching voltage. At this point, the output of the amplifier 10 becomes sufficiently positive with respect to P+ to cut off the diode $d_2$ and allow the positive voltage derived from P+ to be applied once more to the inverting input of the operational amplifier 24. Its output then goes negative and cuts off $Q_1$ and $Q_2$.

A similar operation is brought about when an over-voltage condition occurs by connecting an over-voltage detector 46 to the base of an NPN transistor $Q_3$. The emitter of $Q_3$ is connected to floating ground, its collector is connected to the cathode of a diode $d_3$, and the anode of $d_3$ is connected to the junction $J_3$. When over-voltage occurs, sufficient current flows through the transistor $Q_3$, the diode $d_3$ and the resistor 42 to lower the voltage of $J_3$ to a point where $d_1$ ceases to conduct. The inverting input of the amplifier 24 is then made less positive than its non-inverting input so as to cause the output to become positive and make the Darlington circuit $Q_1$, $Q_2$ conduct.

For reasons of safety, it is desired to discharge the capacitor C whenever the AC power is turned off or fails. This is accomplished by connecting the AC dropout detector 48 to the cathode of a diode $d_4$ and connecting the anode of $d_4$ to the junction $J_3$. For the discharge circuit to operate under this condition, it is necessary that operating potential be applied to the operational amplifier 24 for a period following the loss of AC power that is long enough to permit complete discharge of the capacitor C. This function is performed by the slow discharge of the capacitor 32 which supplies the operating potential via the lead 40.

The current that flows through the transistors $Q_1$ and $Q_2$ can be increased beyond the rated steady value if the time during which the current flows is limited. A timing circuit is therefore provided for permitting the positive voltage supplied to the inverting input of the amplifier 24 via $d_1$ to be removed for a limited time that is long enough for the output capacitor C to be discharged to whatever level is required. It is comprised of a diode $d_5$ having its anode connected to the junction $J_3$ and its cathode connected to a point of floating ground potential via a capacitor 50 and a resistor 52 connected in parallel. The junction $J_4$ of the anode of $d_5$, the capacitor 50, and the resistor 52 is connected to the inverting input of a comparator 56, and the reference voltage $V_R$ at the junction $J_2$ is applied to its non-inverting input via a lead 58. The output of the comparator 56 is connected to the anode of a diode $d_6$, and the cathode of $d_6$ is connected to the inverting input of the operational amplifier 24. When none of the diodes $d_2$, $d_3$ or $d_4$ are conducting, the capacitor 50 is charged up to a positive voltage that is greater than $V_R$ so that the output of the operational amplifier 56 is negative, cutting off $d_6$. However, whenever any of these diodes conducts in response to one of the conditions previously explained, the voltage at $J_3$ drops, diode $d_5$ is cut off, and the capacitor 50 discharges through the parallel resistor 52. Until the voltage across the capacitor 50 drops below $V_R$, the output voltage of the amplifier 56 remains low so that $d_6$ is cut off, but when the voltage across the capacitor 50 falls below $V_R$, the output of the amplifier 56 becomes positive and a positive voltage is applied via the diode $d_6$ to the inverting input of the amplifier 24, causing its output to become negative and cut off the Darlington circuit $Q_1$, $Q_2$.

Overall Operation

When the positive voltage derived from P+ and supplied to the inverting input of the amplifier 24 via the diode $d_1$ is removed by conduction of any of the diodes $d_2$, $d_3$ or $d_4$, the voltage of the inverting input drops below the reference voltage applied to its non-inverting input so that the output of the operational amplifier 24 becomes positive, causing $Q_1$, and $Q_2$ to conduct and discharge the capacitor C. This continues until the voltage at the junction $J_1$ drops below the output voltage of the digital-to-analog converter 8 that is selected by the controller 6, but it cannot continue longer than permitted by the timing circuit 50, 52 associated with the comparator 56. As the voltage across the capacitor C decreases, the voltage applied to the inverting input of the amplifier 24 also decreases so that the output of the amplifier becomes more positive. This biases the transistors $Q_1$ and $Q_2$ so that they conduct more current. Thus, as the voltage across the output capacitor C falls, the discharge current increases so that the discharge circuit has a negative resistance characteristic. In order to protect the transistors $Q_1$ and $Q_2$, the discharge is controlled by applying the voltage across the monitoring resistor $R_M$ to the inverting input of the operational amplifier via the feedback resistor 28.

By selection of the switching voltage, the flow of discharge current through $Q_1$ and $Q_2$ can be made to start whenever the regulation circuits, not shown, in the power supply 4 are set to reduce the voltage across the output capacitor C to the maximum of their capability. This occurs, for example, when the "on" time of a pulse width regulator is zero, or when the impedance of a series pass regulator is at a maximum.

Instead of using the Darlington configuration of $Q_1$ and $Q_2$, a single transistor such as $Q_1$ might be used, in which case its base would be connected to the output of the amplifier 24. Although the discharge circuit of this invention has been described in relation to a power supply wherein the output 18 is positive with respect to the output 16, it can be altered by one skilled in the art to operate with a power supply in which the output 18 is negative with respect to the output 16.

In the alternative arrangement of FIG. 1A, those components that correspond to components of FIG. 1 are designated by the same numbers or letters primed. Instead of applying a positive reference potential $V_R$ to the non-inverting input of the amplifier 24', that input is connected to floating ground and a negative reference voltage $V_R$ is applied to the inverting input of the amplifier 24' via a resistor 58. The negative reference voltage $V_R$ is less than the positive voltage at the inverting input derived from P+' via the diode $d_1'$ so that the output of the amplifier 24' is negative and $Q_1'$ and $Q_2'$ are cut off. When one of the diodes $d_3'$, $d_4'$ or $d_2'$ conducts, $d_1'$ is cut off and the output of the amplifier 24' becomes positive so as to cause $Q_1'$ and $Q_2'$ to conduct.

In addition to discharging the output capacitor C at a faster rate because of the negative resistance characteristic provided and because of the timing circuit associated with the comparator 56, the circuit has the further advantage of being triggered into action by any one of the diodes d₂', d₃' or d₄'. It could be made responsive to other conditions by using additional diodes.

What is claimed is:

1. A power supply comprising
   an output capacitor,
   means for applying a regulated desired direct current voltage to said capacitor,
   a transistor having a collector, an emitter, and a base,
   means coupling the collector-to-emitter path of said transistor across said output capacitor with such polarity as to discharge said capacitor when current is flowing in the said path,
   means for applying a bias to the base of said transistor that cuts off current flow in the path between its collector and emitter,
   means for selecting the value of regulated voltage that is to exist across said capacitor,
   means for comparing the difference between the value of voltage selected and the voltage across said capacitor,
   means for removing said cut-off bias from the base of said transistor when said difference in voltage attains a predetermined value so as to initiate discharge of said capacitor, and
   means for applying a forward bias to the base of said transistor that increases as the voltage across said capacitor decreases, thereby causing said transistor to have a negative resistance characteristic.

2. A circuit for discharging the output capacitor of a power supply that derives a regulated direct current voltage from a source of alternating current voltage, comprising
   first and second inputs adapted to be respectively connected to opposite sides of an output capacitor to be discharged,
   means for connecting said first input to a point of floating ground potential,
   a metering resistor,
   a transistor having an emitter, a collector, and a base,
   means connecting said metering resistor and the emitter-to-collector path of said transistor in series between said first and said second inputs, one end of the resistor being connected to said first input,
   an operational amplifier having an inverting input, a non-inverting input, and an output,
   means coupling the output of said operational amplifier to the base of said transistor,
   a first resistor connected between the end of said metering resistor that is remote from floating ground and the inverting input of said operational amplifier,
   a second resistor connected between the inverting input of said operational amplifier and said second input,
   means for applying a potential to said inputs of said operational amplifier that causes its output to have a voltage that cuts off conduction in the emitter-to-collector path of said transistor, and
   means responsive to a given condition for changing the potential applied to at least one of the inputs of said operational amplifier so as to cause its output voltage to change in a direction as to cause conduction in the emitter-to-collector path of said transistor.

3. A circuit as set forth in claim 2 wherein timing circuit means are provided for rendering said last-named means effective for a predetermined amount of time.

4. A circuit as set forth in claim 2 wherein said last-named means is responsive to the existence of a voltage between said first and second inputs that is greater than a desired voltage.

5. A circuit as set forth in claim 2 wherein said last-named means is responsive to an over-voltage condition.

6. A circuit as set forth in claim 2 wherein means are provided for deriving operating potential for said amplifier from said source of alternating current voltage, wherein said last-named means is responsive to a loss of the alternating current voltage and wherein means are provided for continuing the provision of operating potential for said amplifier for a predetermined time after the loss of the alternating current voltage.

7. A power supply, comprising
   rectifying means for deriving at its output a regulated direct current voltage from a source of alternating current voltage when present,
   an output capacitor coupled to the output of said means,
   a transistor having a collector, emitter, and base,
   a metering resistor connected in series with the collector-emitter path of said transistor to form a series circuit,
   means connecting said series circuit across said capacitor with the transistor having such polarity as to discharge said capacitor through its collector-emitter path when conduction occurs therein,
   a first operational amplifier having a non-inverting input, an inverting input and an output,
   means coupling the output of said amplifier to the base of said transistor,
   a first resistor connected between one of said inputs to said operational amplifier and one side of said capacitor,
   a second resistor connected between the junction of said metering resistor and said transistor and one input of said amplifier,
   means for applying control potentials to said inverting and non-inverting inputs that cause the output of said amplifier to cut off current flow in the collector-emitter path of said transistor,
   means for providing a control signal indicative of the desired regulated direct voltage to be maintained across said capacitor,
   means coupled to said means for providing a control signal and to said capacitor for deriving an error signal indicating the difference between the desired voltage and any voltage across said capacitor,
   means coupling said error signal to said means for deriving a regulated direct current voltage, and
   means for changing the control potential applied to at least one said inverting and non-inverting inputs of said first amplifier when said error signal indicates that the desired direct current voltage is less than the actual voltage across said capacitor by a predetermined amount.

8. A circuit for discharging a capacitor, characterized by
   means providing a discharge path in shunt with said capacitor,
   means for causing said discharge path to have a high impedance so that said capacitor is not discharged,
   disabling means for disabling said latter means in response to a given signal so as to cause said discharge path to have a low impedance, and impedance control means for decreasing the impedance of said discharge path as the voltage across said capacitor decreases.

9. A circuit as set forth in claim 8 having means for disabling said disabling means at a given time after said signal occurs.

10. A circuit as set forth in claim 8 wherein said means providing said discharge path is a transistor having its main conduction path connected in shunt with said capacitor, and having a control electrode for controlling the current flowing in its main conduction path, said means for causing said discharge path to have a high impedance includes means for applying a cut-off bias to said control electrode, said disabling means includes means for interrupting the application of said cut-off bias to said control electrode, and said impedance control means includes means coupled to said capacitor for applying a portion of the voltage across said capacitor to said control electrode in such manner that the conduction in the main conducting path of said transistor increases as the voltage across said capacitor decreases.

11. A circuit as set forth in claim 9 wherein said means for disabling said disabling means includes means for restoring the cut-off bias applied to said electrode a given time after it is interrupted.

* * * * *

UNITED STATES PATENT AND TRADEMARK OFFICE
CERTIFICATE OF CORRECTION

PATENT NO. : 4,272,717
DATED : June 9, 1981
INVENTOR(S) : Paul W. Bailey

It is certified that error appears in the above-identified patent and that said Letters Patent are hereby corrected as shown below:

Column 2     line 29     "20" should read -- 30 --

Column 4     line 60     "$Q_1'$ and $Q_2'$" should read -- $Q_1$ and $Q_2$ -- line 63     "$Q_1'$ and $Q_2'$" should read -- $Q_1$ and $Q_2$ --

Signed and Sealed this

Fifteenth Day of September 1981

[SEAL]

Attest:

Attesting Officer

GERALD J. MOSSINGHOFF

Commissioner of Patents and Trademarks